(12) United States Patent
Faus Gregori

(10) Patent No.: US 10,757,629 B2
(45) Date of Patent: Aug. 25, 2020

(54) HANDOVER METHOD

(71) Applicant: British Telecommunications Public Limited Company, London (GB)

(72) Inventor: Francisco Jose Faus Gregori, London (GB)

(73) Assignee: British Telecommunications Public Limited Company, London (GB)

( * ) Notice: Subject to any disclaimer, the term of this patent is extended or adjusted under 35 U.S.C. 154(b) by 0 days.

(21) Appl. No.: 16/087,827

(22) PCT Filed: Mar. 27, 2017

(86) PCT No.: PCT/EP2017/057225
§ 371 (c)(1),
(2) Date: Sep. 24, 2018

(87) PCT Pub. No.: WO2017/167701
PCT Pub. Date: Oct. 5, 2017

(65) Prior Publication Data
US 2019/0116540 A1    Apr. 18, 2019

(30) Foreign Application Priority Data
Mar. 31, 2016 (EP) .................................... 16163457

(51) Int. Cl.
*H04W 4/00* (2018.01)
*H04W 36/36* (2009.01)
(Continued)

(52) U.S. Cl.
CPC .......... *H04W 36/36* (2013.01); *H04L 63/164* (2013.01); *H04W 36/0038* (2013.01);
(Continued)

(58) Field of Classification Search
None
See application file for complete search history.

(56) References Cited

U.S. PATENT DOCUMENTS 9,883,436 B2    1/2018   Brown
10,123,241 B2   11/2018  Brown
(Continued)

FOREIGN PATENT DOCUMENTS

EP      2 925 056 A2       9/2015
WO   WO 2004/102919 A1   11/2004
(Continued)

OTHER PUBLICATIONS

International Search Report for corresponding PCT Application No. PCT/EP2017/057225, dated Sep. 3, 2015, 4 pages.
(Continued)

*Primary Examiner* — Zewdu A Beyen
(74) *Attorney, Agent, or Firm* — Patterson Thuente Pedersen, P.A.

(57) ABSTRACT

A method of performing network handover between wireless local area network devices for a mobile device connected to a voice service via a secure data tunnel to a packet data gateway of a cellular network including determining that a quality of a connection to a current wireless local area network is below a threshold value; determining that a handover target network is available; establishing connectivity with the target handover network; suppressing a connection to a base station of the cellular network; sending a new network address of the mobile device to the packet gateway using a set of credentials relating to the secure data tunnel so as to change an endpoint of the secure data tunnel to the new network address.

5 Claims, 7 Drawing Sheets

(51) Int. Cl.
  *H04W 36/00* (2009.01)
  *H04W 36/30* (2009.01)
  *H04W 76/22* (2018.01)
  *H04L 29/06* (2006.01)
  *H04W 84/12* (2009.01)

(52) U.S. Cl.
  CPC .......... *H04W 36/30* (2013.01); *H04W 76/22* (2018.02); *H04W 84/12* (2013.01)

(56) References Cited

U.S. PATENT DOCUMENTS

| | | |
|---|---|---|
| 10,142,919 B2 | 11/2018 | Brown |
| 2005/0059400 A1 | 3/2005 | Jagadeesan et al. |
| 2006/0217147 A1* | 9/2006 | Olvera-Hernandez ..................... H04W 36/005 455/552.1 |
| 2009/0046655 A1 | 2/2009 | Zhao et al. |
| 2011/0002466 A1 | 1/2011 | Kwak et al. |
| 2012/0315905 A1 | 12/2012 | Zhu et al. |
| 2014/0313888 A1 | 10/2014 | Linkola |
| 2016/0165532 A1* | 6/2016 | Nagasaka ............. H04W 48/16 370/338 |
| 2016/0174110 A1 | 6/2016 | Sharma et al. |
| 2016/0347298 A1 | 12/2016 | Jung |
| 2017/0034729 A1 | 2/2017 | Persson et al. |
| 2019/0014519 A1 | 1/2019 | Brown et al. |

FOREIGN PATENT DOCUMENTS

| | | |
|---|---|---|
| WO | WO 2007/076147 A2 | 7/2007 |
| WO | WO 2015/150745 A1 | 10/2015 |
| WO | WO2017114932 | 7/2017 |
| WO | WO 2017/167694 A1 | 10/2017 |
| WO | WO 2017/167701 A1 | 10/2017 |
| WO | WO 2018/002130 A1 | 1/2018 |
| WO | WO2018/178241 | 10/2018 |
| WO | WO2018/178293 | 10/2018 |
| WO | WO2018/178294 | 10/2018 |
| WO | WO2018/234037 | 12/2018 |
| WO | WO2018/234038 | 12/2018 |

OTHER PUBLICATIONS

International Preliminary Report on Patentability for corresponding PCT Application No. PCT/EP2017/057225, dated Oct. 2, 2018, 10 pages.

Kaufman et al.; "RFC 7296—Internet Key Exchange Protocol Version 2 (KIEv2)", Oct. 1, 2014, XP055243756, retrieved from the internet: http://tools.ietf.org/html/rfc7296#page-58.

Application as filed for U.S. Appl. No. 16/086,351, filed Sep. 19, 2018, Inventor(s): Brown et al.

International Preliminary Report on Patentability for corresponding International Application No. PCT/EP2016/082894 dated Jul. 3, 2018; 9 pages.

International Search Report and Written Opinion for corresponding International Application No. PCT/EP2016/082894 dated Feb. 17, 2017; 12 pages.

3GPP TS 23.402 V13.4.0 (Dec. 2015) 3$^{rd}$ Generation Partnership Project; Technical Specification Group Services and System Aspects; Architecture enhancements for non-3GPP accesses (Release 13); 650 Route des Lucioles—Sophia Antipolis Valbonne; 298 pages.

Ericsson; "W-Fi calling—extending the reach of VoLTE to Wi-Fi Wi-Fi calling—extending the reach of VoLTE to Wi-Fi", Jan. 30, 2015, XP055251865; 5 pages [retrieved Dec. 26, 2018].

International Preliminary Report on Patentability for PCT Application No. PCT/EP2017/057204 dated Oct. 2, 2018; 6 pages.

International Search Report and Written Opinion for PCT Application No. PCT/EP2017/057204 dated Apr. 21, 2017; 9 pages.

Application as filed for U.S. Appl. No. 16/311,826, filed Dec. 20, 2018, Inventor(s): Brown et al.

International Search Report and Written Opinion for PCT Application No. PCT/EP2017/065977 dated Sep. 6, 2017; 10 pages.

Application and Filing Receipt for U.S. Appl. No. 16/065,906, filed Jun. 25, 2018, Inventor(s): Brown et al.

3$^{rd}$ Generation Partnership Project (3GPP) specification TS 22.173 V7.3.0. (Mar. 2007) Technical Specification Group Services and System Aspects; IP Multimedia Core Network Subsystem (IMS) Multimedi Telephony Service and supplementary services Stage 1; (Release 7); 10 pages.

Eronen; RFC 4555—IKEv2 Mobility and Multihoming Protocol (MOBIKE) Nokia, Network Working Group Request for Comments: 4555, Category: Standards Track; Jun. 1, 2006; XP055299729; 34 pages.

International Preliminary Report on Patentability, Application No. PCT/EP2018/058202, dated Oct. 1, 2019, 9 pages.

International Search Report and Written Opinion, Application No. PCT/EP2018/058202, dated May 2, 2018, 11 pages.

International Search Report Written Opinion, Application No. PCT/EP2018/058199, dated May 17, 2018, 18 pages.

International Preliminary Report on Patentability, Application No. PCT/EP2018/058199, dated Oct. 1, 2019, 15 pages.

International Search Report and Written Opinion, Application No. PCT/EP2018/058085, dated May 17, 2018, 4 pages.

International Preliminary Report on Patentability, Application No. PCT/EP2018/058085, dated Oct. 1, 2019, 16 pages.

* cited by examiner

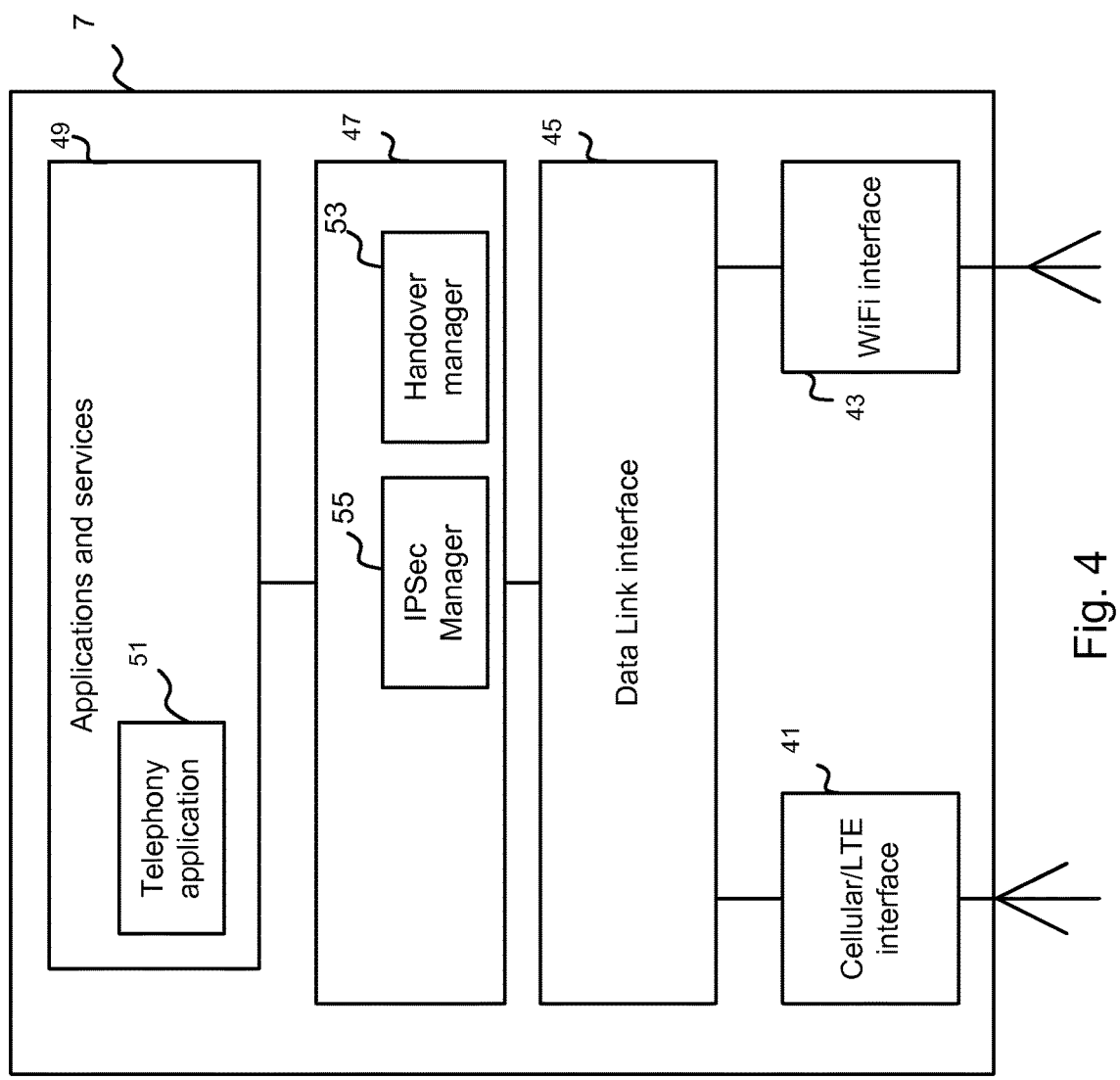

HANDOVER METHOD

CROSS-REFERENCE TO RELATED APPLICATION

The present application is a National Phase entry of PCT Application No. PCT/EP2017/057225, filed Mar. 27, 2017, which claims priority from EP Patent Application No. 16163457.1, filed Mar. 31, 2016 each of which is hereby fully incorporated herein by reference.

TECHNICAL FIELD

The present disclosure relates to wireless networks and in particular to a method for performing handover between Wireless local area networks supporting a VoWiFi voice service.

BACKGROUND

Wireless Local Area Networks

Wireless local area networks (WLAN) provide wireless data connectivity to wireless client devices over a limited coverage range. Commonly known as WiFi™, the wireless networking protocol is defined by the IEEE 802.11 family of standards. The standards specify how frequencies, data rates, authentication, etc. to allow internetworking between devices from different manufacturers.

VoWiFi

A recent development is the ability for client devices to offer voice calling through the standard dialer application on mobile device. In contrast to Voice over IP (VoIP) services, the mobile device is contactable via the cellular number associated with the device via a cellular, and in particular Long Term Evolution (LTE) data network.

The VoWiFi application resides within the IMS platform and therefore can allow handover between the cellular network and VoWiFi supporting WiFi network estate. A typical handover scenario is when a user returns home and the mobile device which is connected to a macrocell of the LTE network hands over to the user's home network wireless network to maintain the same service. When the user leaves the range of their home network, then their mobile device will be configured to handover from the home WLAN to the macrocell eNodeB.

In the current implementations, only handovers from VoLTE to VoWiFi and VoWiFi to VoLTE are considered.

Although a WiFi network generated by a single Wireless Access Point may only extend for tens of meters due to transmission power constraints, it is known to configure several WAPs to have the same SSID and authentication settings to allow client devices to change physical location while still being connected to WiFi. A corporate network in a large office building is an example. Furthermore, public hotspot networks are also known whereby the access points are placed over a geographic area such as a city and configured to have the same SSID but no WLAN authentication. A centralized server carries out authentication at a higher network layer and client WiFi devices with a valid login are able to access the hotspot network wherever there is a hotspot device. An example of a hotspot network is the BT WiFi™ network. Especially in densely populated areas, the range of these hotspot WAPs may result in there being a contiguous range of WiFi connectivity such that the user can travel for a range beyond their home WiFi network and still be connected to the same WiFi hotspot network. However, for VoWiFi, the standard handover mechanisms require the VoWiFi service to handover to the VoLTE service before then handing over back to the newly connected WiFi network and VoWiFi service. This processing to switch between three different physical networks is costly in terms of time and processing power.

Similarly, if the user does not wish to use VoLTE or their device is not capable of supporting the LTE network, it is not possible to seamlessly switch between WAPs so that VoWiFi connectivity is maintained without a temporary break in service where calls and messages may be missed.

SUMMARY

Aspects of the present disclosure address the above problem of handover between non-3GPP access networks.

In one aspect, the present disclosure provides a method of performing network handover between wireless local area network devices for a mobile device connected to a voice service via a secure data tunnel to a packet data gateway of a cellular network, comprising: determining that a quality of a connection to a current wireless local area network is below a threshold value; determining that a handover target network is available; establishing connectivity with the target handover network; suppressing a connection to a base station of the cellular network; sending a new network address of the mobile device to the packet gateway using a set of credentials relating to the secure data tunnel so as to change an endpoint of the secure data tunnel to the new network address.

In a second aspect, an embodiment of the disclosure provides an apparatus for connecting to a voice service via a secure data tunnel to a packet data gateway of a cellular network and operable to perform network handover between wireless local area network devices via a secure data tunnel to a packet data gateway of a cellular network, comprising: a cellular network interface; a wireless local area network interface; means for determining that a quality of a connection to a current wireless local area network is below a threshold value; means for determining that a handover target network is available; means for establishing connectivity with the target handover network; means for suppressing a connection to a base station of the cellular network; means for sending a new network address of the mobile device to the packet gateway using a set of credentials relating to the secure data tunnel so as to change an endpoint of the secure data tunnel to the new network address.

BRIEF DESCRIPTION OF THE FIGURES

A first embodiment of the present disclosure will now be described with reference to the following figures in which:

FIG. 4 shows the functional components of a mobile device.

FIG. 5 shows the functional components of a packet data gateway.

DESCRIPTION

Figure 1:
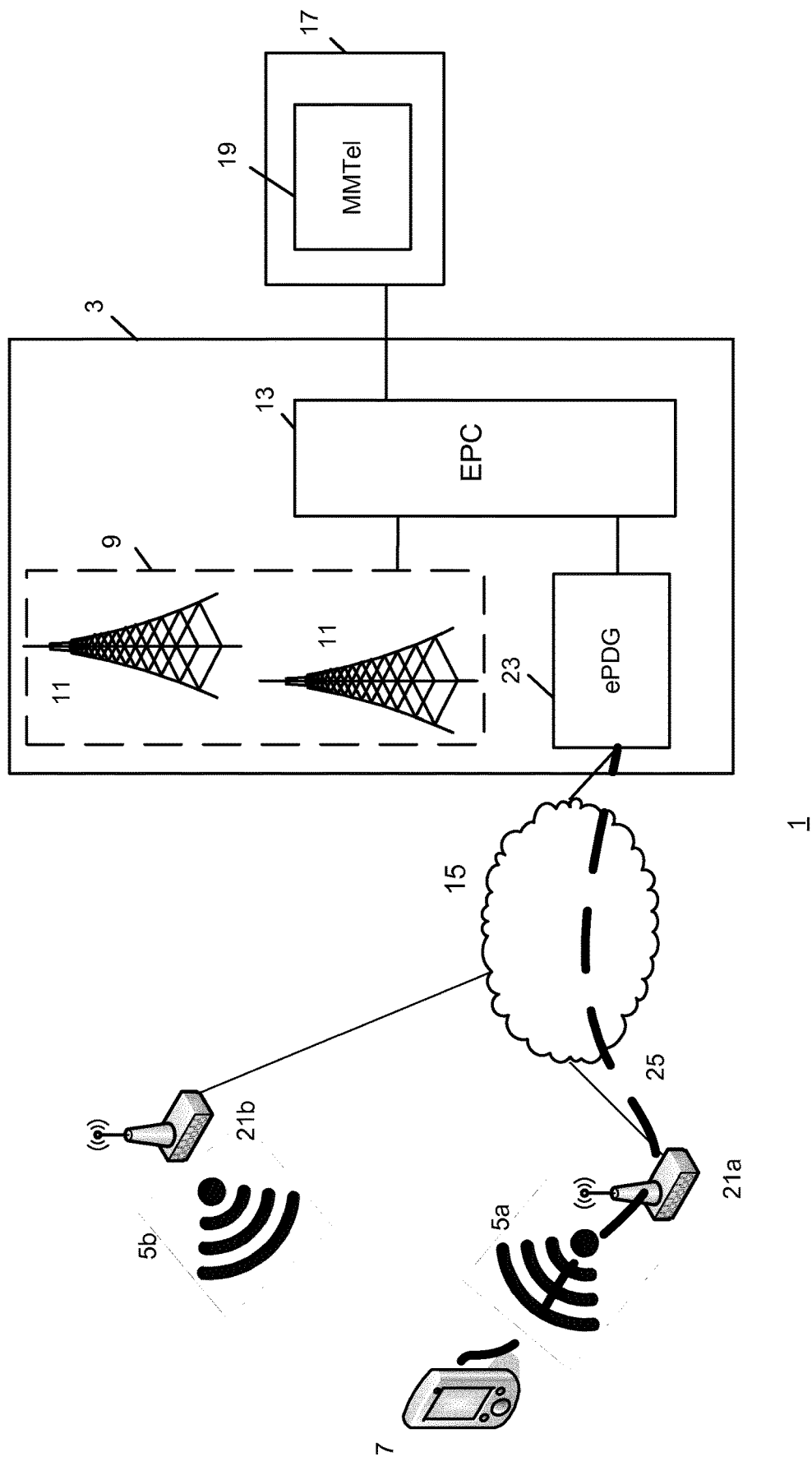
FIG. 1 is an overview of a voice service network formed of both a cellular network and a number of wireless access points.

FIG. 1 shows an overview of voice system 1 including a cellular network system 3 and a number of wireless local area networks (WLAN) 5. The system also includes mobile devices 7 having cellular network interfaces to enable connection to the cellular network 3 and wireless local area network (WLAN) interfaces to enable connection to the WLANs 5 so that a voice service can be provided via both interfaces. For ease of explanation, only a single mobile device 7 is shown and described.

The cellular network 3 provides wide area cellular connectivity to the mobile device 7 which is a mobile phone. In this embodiment the cellular network is a Long Term Evolution (LTE) network. The cellular network 3 includes a radio access network 9 of macrocells 11, implemented as eNodeBs in LTE, and the mobile device 7 accesses the cellular network via one of the macrocells 11. The radio access network is connected within the cellular network to a mobile network core 13, implemented as an Evolved Packet Core (EPC) in LTE, which contains functionality for managing the non-Access aspects of the cellular network such as performing control functions including allocating network addresses, cell tracking area updates, mobile device authentication and billing, etc. In addition to the control plane functions, the network core also contains Serving Gateways and Packet Gateways for routing mobile device packets between the devices and network resource which may be located on external wide area networks such as the Internet 15.

To allow mobile devices to access a voice service in the LTE network, and in particular a Voice over LTE (VoLTE) service, the network core 3 is connected to an IP Multimedia Subsystem (IMS) 17 which includes a Multimedia Telephony (MMTel) service 19 which manages voice services for mobile devices 7 in accordance with VoLTE. MMTel is defined in the $3^{rd}$ Generation Partnership Project (3GPP) specification TS 22.173.

The mobile devices 7 have a cellular interface to allow them to connect to one of the macrocells 11 forming the radio access network 9 of the cellular network 3. Once connected to the radio access network 9 and authenticated with the network core 13, the client device 7 can access voice and data services such as VoLTE.

The mobile device 7 also contains a wireless local network interface to access wireless local area networks (WLAN) 5 which are generated by a respective wireless access point 21. In FIG. 1, two wireless access points are shown. The mobile device 7 is connected to a first wireless access point 21a which generates a WLAN 5a in accordance with the IEEE 802.11 family of protocols commonly known as Wi-Fi. A second wireless access point 21b is also shown which generates a second WLAN 5b. The second wireless access point 21b is located such that the extent of the second WLAN 5b overlaps with the extent of the first WLAN 5a such that the mobile device could connect to either WLAN 5 but has connected to WLAN 5a due to a stronger signal strength to WLAN 5a from the mobile device's 7 current location.

The wireless access point 21 associated with each WLAN 5 is connected to a wide area network such as the Internet 15 so that the mobile device can access remote data services and resources. Furthermore the mobile device 5 is allocated an Internet Protocol (IP) address so that data sessions can be correctly routed to and from the remote resources. In this example, the wireless access point 21 is allocated a global IP address which can be addressed by any remote resource and then uses Network Address Translation (NAT) to allocate a local IP address from a private range of addresses. However due to the NAT feature, the mobile device is deemed by external devices to also have the same address as the wireless access point 21. For example the wireless access point 21a has a global IP address of 89.1.5.53 and allocates the client device has a local address of 192.168.1.45 which is only valid within the WLAN. To external devices, the mobile device has an IP address of 89.1.5.53.

In this embodiment, the client also supports Voice over WiFi (VoWiFi) whereby the mobile device 7 can access the MMTel voice service 19 when connected to a WLAN instead of VoLTE via the cellular network 3. To enable VoWiFi, the cellular network 3 includes an Evolved Packet Data Gateway (ePDG) 23 in the network core 13 for communication with the WLANs 5 which are deemed in 3GPP to be untrusted non-3GPP access networks into the cellular network.

Since the WLANs 5 are untrusted access networks, any data session between a VoWiFi client (not shown) in the mobile device 7 and the ePDG 23 for VoWiFi must be secured using an encrypted data tunnel 25. In this embodiment the Internet Protocol Security (IPSec) framework relating to data confidentiality, data integrity and data authentication is used to secure the tunnel. IPSec is described in RFC 2401. Any other data sessions which do not involve access to the cellular network 3 would not travel via the data tunnel 25.

To enable the establishment of an IPSec tunnel, the ePDG 23 has a global IP address which in this example is 204.83.73.84.

In accordance with IPSec routines, the VoWiFi client in the mobile device 7 and the ePDG 23 establish a secure data tunnel through a series of authentication, verification steps including Internet Security Association and Key Management Protocol (ISAKMP).

The IPSec tunnel is actually formed of a pair of Security Associations (SA). In IPSec, SAs are a bundle of algorithms and parameter data sets which are used to encrypt and authenticate a particular flow in one direction. Therefore a pair of SAs is used to secure the bi-directional session. Each SA data set contains a Security Parameter Index (SPI), destination address, security keys, transforms, lifetime, etc. The SPI is an identification tag which is added to a packet header when tunneled the IP traffic. The tag is added by a sender and used by the receiver to uniquely associate a received tunneled packet with an IP flow where different encryption protocols and algorithms may be in use.

As shown in FIG. 1, the VoWiFi client of the mobile device 7 has at least the following IPSec SA data:

| UE IP address: 89.1.5.53 | |
|---|---|
| SA1: SPI 1be0ac4585574a8f, | Dest IP 204.83.73.84, |
| SA2: SPI: 84167b6600000000, | Dest IP: 89.1.5.53, |

In the context of VoWiFi, the mobile device 7 will only be connected to a single ePDG and therefore only stores details of a single IPSec tunnel.

The ePDG 23 can potentially be the end point for several IPSec tunnels and therefore it can store state data for a number of IPSec tunnels including the mobile device 7 address, an IPSec identifier and SA configuration data.

An example of the data stored at the ePDG 23 relating to the IPSec tunnel to the mobile device 7:

| Device 1 | Device 2 | Device 3 |
|---|---|---|
| UE IP address 89.1.5.53<br>IP Sec tunnel identifier A<br>Device 1 IPSec SA config data. | empty | empty |

Once the IPSec tunnel 25 has been established, the mobile device 7 is authenticated by the network core 13 functions in a conventional manner using for example, EAP-SIM. To enable VoWiFi for the mobile device 7, the network core 13 establishes a link from the mobile device data packets flowing via the IPSec tunnel 25 with the MMTel service 13 within the IMS 11.

While the mobile device 7 is connected to the WLAN 5a generated by the first wireless access point, the mobile device 7 will remain connected to VoWiFi in preference to VoLTE and data will continue to flow via the IPSec tunnel 25.

Figure 2:
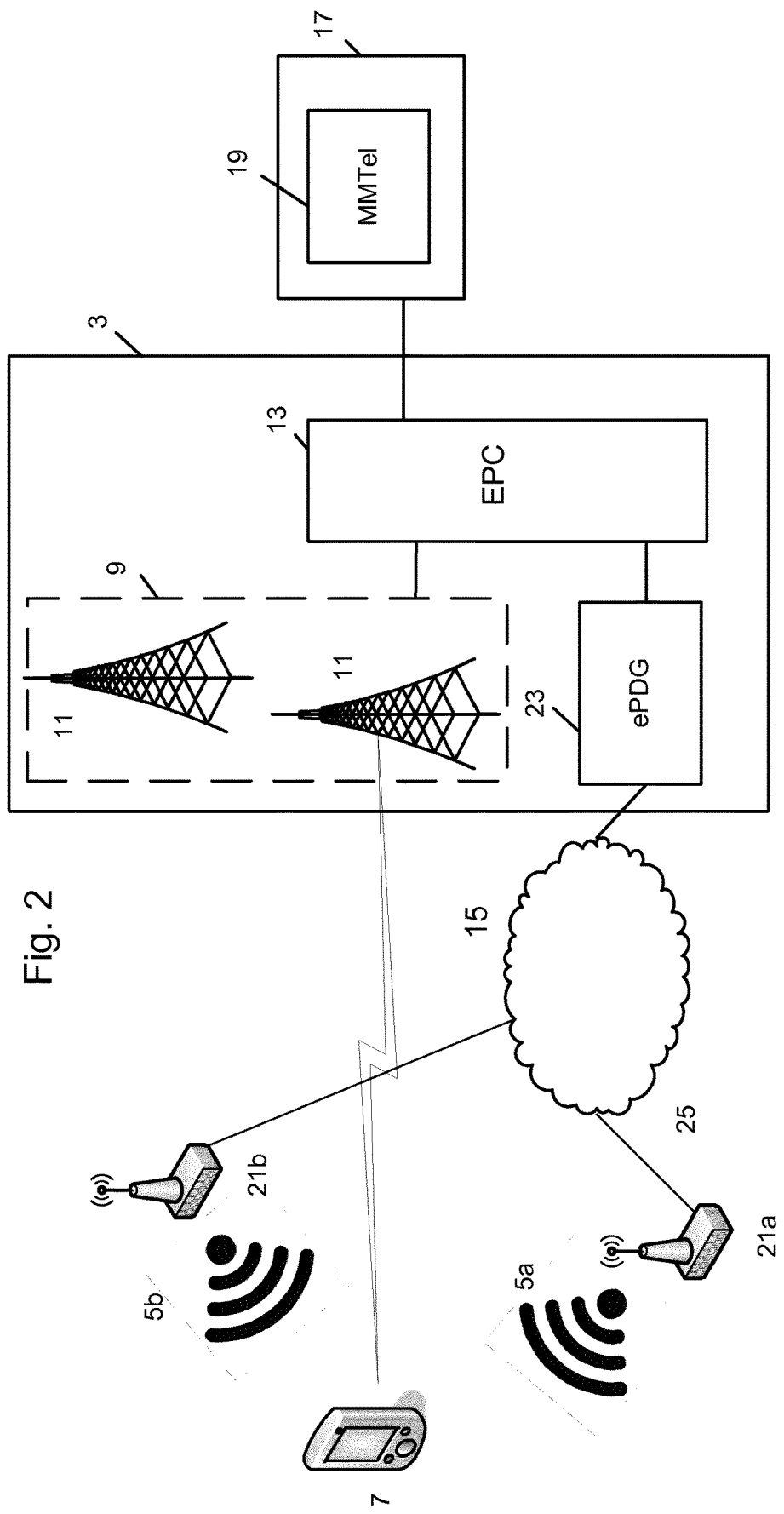
FIG. 2 shows the voice service network where a mobile device has connected to the cellular network.

However, when the mobile device 7 changes location such that it cannot stay connected to the WLAN 5a generated by the first wireless access point 21a, it will connect to another WLAN in range. As shown in FIG. 2 the mobile device has connected to WLAN 5b generated by wireless access point 21b.

As currently defined in the VoWiFi standards, the loss of the WLAN connection triggers the mobile device 7 to attempt to register with VoLTE.

FIG. 2 shows the voice system 1 when the client device 7 has changed location so that it is not within the connectivity range of the first wireless access point 15. The client device 5 is now physically located nearer to the WLAN 5b of the second wireless access point 21b.

In this embodiment, the general behavior of the mobile device 7 is to try to connect to a WLAN connection in preference to an LTE connection. Therefore when the mobile device 7 loses its link to the WLAN 5a of the first wireless access point 21, if it detects the WLAN 5b of the second wireless access point 21b it will connect to the WLAN 5b without checking the status of the cellular network connection and any non-real time data sessions will not be disrupted.

However, in the processing for VoWiFi and VoLTE, the default action defined in the standards in response to a loss of VoWiFi is to try to connect to VoLTE. As a result, mobile device 7 will perform a cleanup process to remove its end of the tunnel and the eDPG 23 will remove its settings for the IPSec tunnel to the mobile device 7 since the tunnel is deemed to be no longer required.

However, since the client device has connected to WLAN 5b of the second access point 21b, the mobile device 7 will try to re-establish the VoWiFi service via the ePDG 23.

Figure 3:
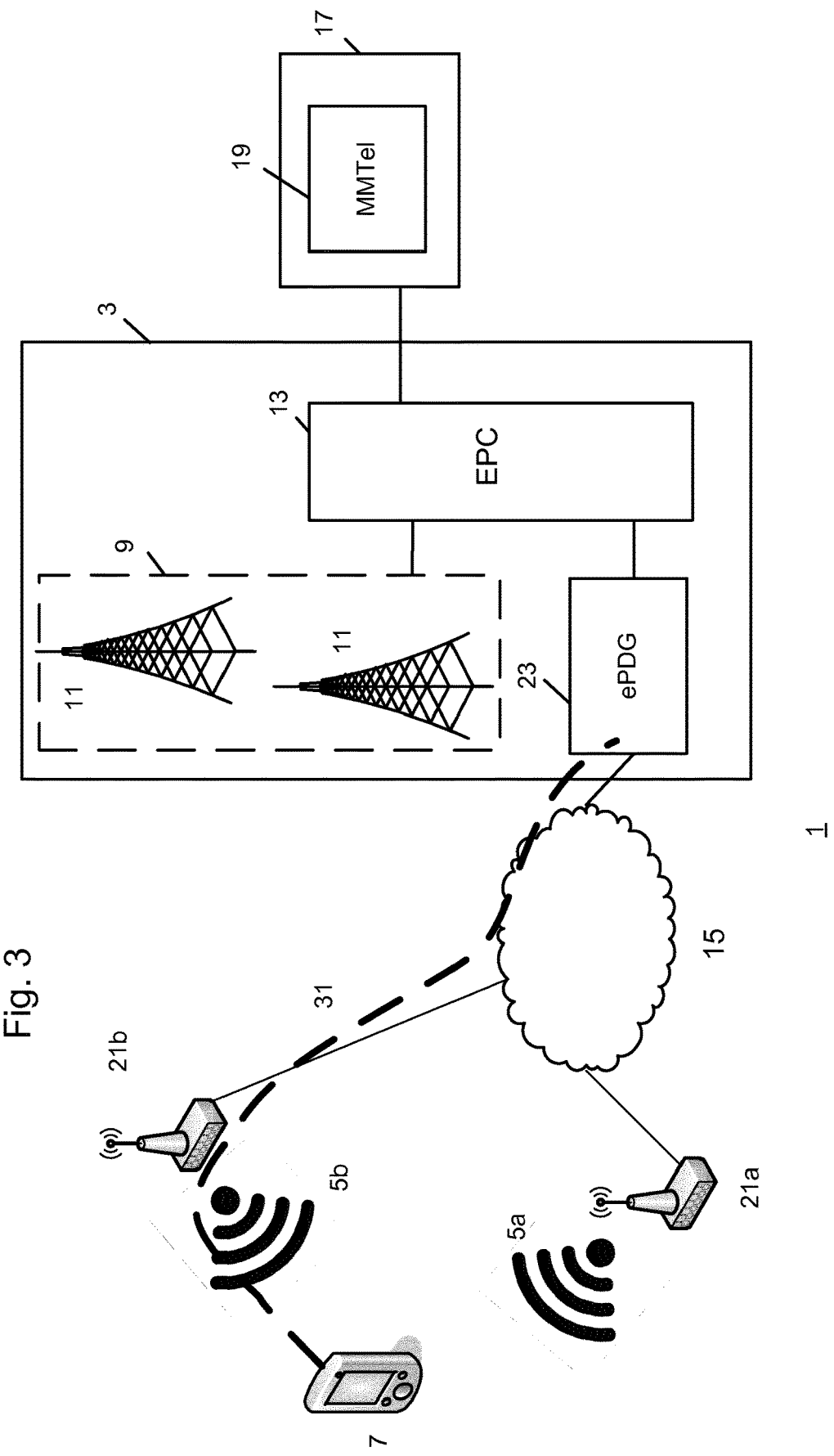
FIG. 3 shows the voice service network where the mobile device has connected to a second wireless access point and established a new data tunnel to the cellular network.

FIG. 3 shows the voice system 1 where the mobile device 7 has connected to the second wireless access point 21b, and a new IPSec data tunnel 31 is formed between the VoWiFi manager of the mobile device 5 and ePDG 23.

As with the first data tunnel 25, the configuration of the second data tunnel 31 is stored at both the mobile device 7 and the ePDG 23. The mobile device 7 now stores a new set of IPSec SA config data:
UE IP address 10.210.207.41
SA1: SPI 1be0ac4585574a8f, Dest IP 204.83.73.84, etc
SA2: SPI: 84167b6600000000, Dest IP: 10.210.207.41, etc The ePDG 23 stores new IPSec tunnel data for the mobile device 7.

| Device 1 | Device 2 | Device 3 |
|---|---|---|
| Empty | UE IP address 10.210.207.41<br>IPSec tunnel identifier B<br>2 IPSec SA config data | empty |

The ePDG 23 regards the mobile device 7 as a new device with a new IPSec tunnel identifier and SA config data because the state data for the mobile device 7 had already been deleted when the connection to VoWiFi via the WLAN 5a of the first wireless access point 21a was broken.

The processing required to tear down and re-establish a data tunnel for the same device within a short period of time is wasteful of resources.

To improve the utilization of network resources, in the first embodiment, the processing of the mobile device 7 and the ePDG 23 is altered to allow the mobile device 7 to move from one WLAN to another WLAN while maintaining an existing IPSec tunnel. In particular, the new network location of the mobile device end of the IPSec tunnel is securely updated at the ePDG.

For example, using the processing of the first embodiment, a transition from the voice network shown in FIG. 1 to the voice network 1 shown in FIG. 3 is possible while omitting the intermediary state shown in FIG. 2.

After the update, the IPSec tunnel state data for the mobile device is:
UE IP address 10.210.207.41
SA1: SPI 1be0ac4585574a8f, Dest IP 204.83.73.84, etc
SA2: SPI: 84167b6600000000, Dest IP: 10.210.207.41, etc
The entry for the mobile device 7 in the ePDG (device 1) is updated as shown below:

| UE IP address 89.1.5.53<br>IP Sec tunnel identifier A<br>Device 1 IPSec SA config data. | → | UE IP address 10.210.207.41<br>IPSec tunnel identifier A<br>Device 1 IPSec SA config data |
|---|---|---|

The components of the voice system which implement the first embodiment will now be described.

FIG. 4 shows the functional components of the mobile device 7. The mobile device includes a cellular network interface 41 and a WLAN network interface 43 for connection and communication with cellular networks 3 and WLANs 5 respectively. A data link interface 45 manages which interface 41, 43 is in use for communication sessions with external devices since in general only one interface is active at a time to prevent excessive batter consumption.

An operating system layer 47 is an interface between the data link interface 45 and higher network level layers such as applications and services layer 49. A telephony application 51 resides in the application layer 49 and is the operable to use the MMTel voice service via VoLTE or VoWiFi.

In accordance with the first embodiment, the client device also includes a modified Handover manager 53 and IPSec manager 55.

The handover manager 53 is responsible for managing the data connection to a radio access network which will be either a Wireless access point using WLAN or a macrocell/small cell using LTE. Functions of the handover manager 53 include monitoring the quality of the current physical layer connection; determining when connectivity is about to be lost with currently connected wireless access point 21, storing handover and user preferences, WLAN or VoLTE preferences, options for Voice over BB if VoLTE is not available, time threshold for waiting for a handover before dropping the SA configuration, SSID blacklists, WLAN quality threshold to initiate handover.

The handover manager is also arranged to use a combination of the network policies or user preference to consider a VoWiFi switch to another wireless access point instead of registering to a macrocell and VoLTE as soon as a break in VoWiFi service is detected.

The IPSec manager 55 in the first embodiment manages the IPSec tunnels and connections to the ePDG 23 and in particular when instructed by the handover manager to make internal changes to the IPSEC SA and send an updated source address and the new IP address of the client device on the new wireless access point to the ePDG in a ISAKMP informational message.

In this embodiment, the IPSec manager 55 uses the IKEv2 Mobility and Multihoming Protocol (MOBIKE) defined in Request for Comments (RFC) 4555 for the signaling exchange which is an extension of the regular IKEv2 protocol as specified in the usual VoWiFi standards.

FIG. 5 shows the functional components of an ePDG 23 in the first embodiment. The ePDG includes a tunnel interface 61 for communication with devices located on the untrusted non-3GPP network and a core network interface 63 for communication with components of the network core 13 of the cellular network 3. For the processing of the first embodiment, the ePDG also includes a modified ePDG IPSec manager for processing update messages from the mobile devices when they have changed to a WLAN and to update IPSec tunnel entries stored in an IPSec configuration store 67.

The operation of the handover manager 53, IPSec manager 55 of the mobile device 7 and the IPSec manager 65 of the ePDG 23 will now be described with the aid of the FIGS. 6 to 8.

Figure 6:
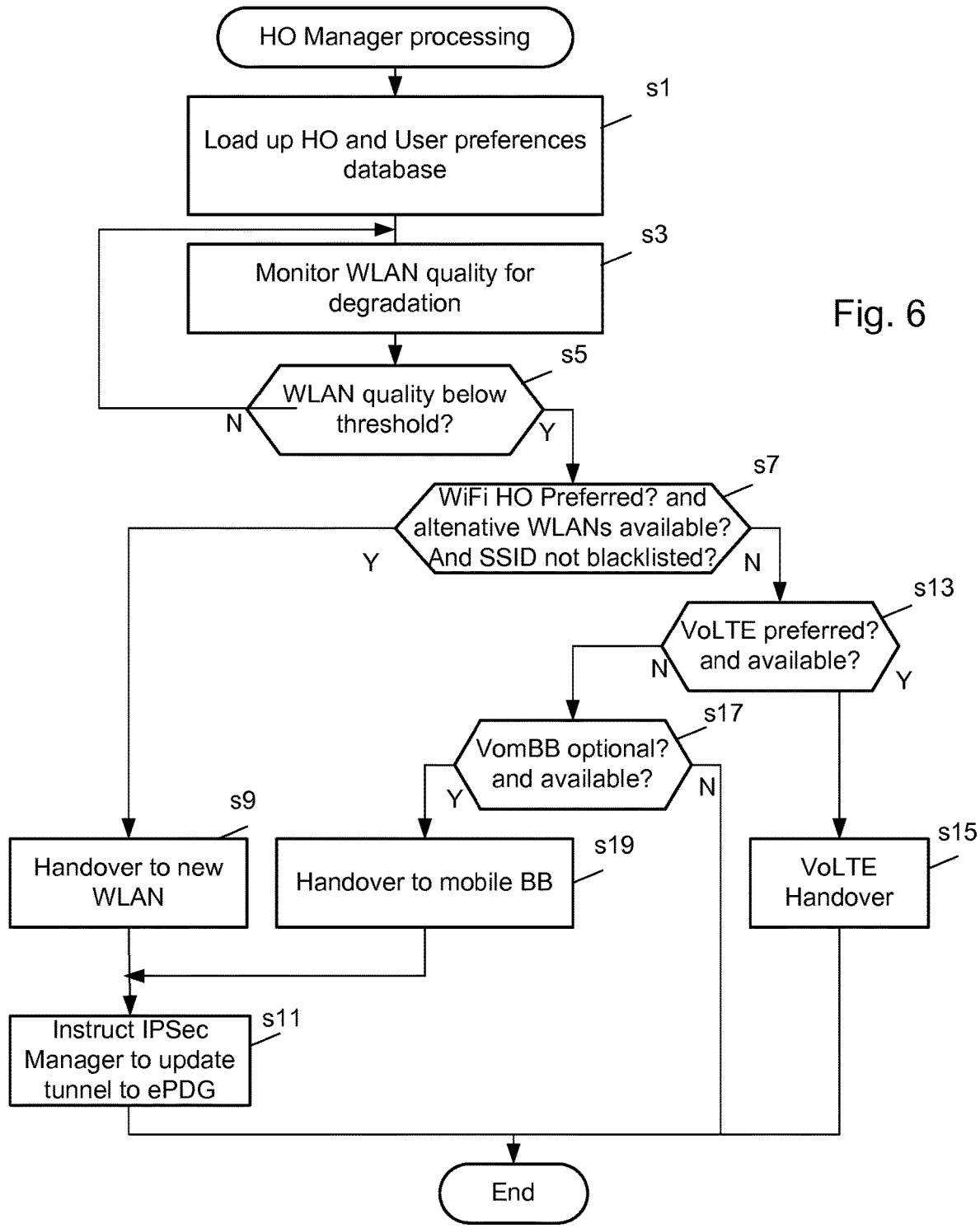
FIG. 6 is a flowchart of the processing of the handover manager shown in FIG. 4.

FIG. 6 is a flowchart of the processing of the Handover manager. When the mobile device 7 has established a VoWiFi data session via the ePDG 23, in s1, the handover manager accesses the handover and user preferences database to set various control thresholds and preferences governing handover behavior. Such preferences include:
WLAN or VoLTE HO preferred,
Voice over mobile BB if no VoLTE available,
new connection HO max wait time before SA drop,
SSID blacklist,
WLAN quality thresholds to initiate HO.

Once loaded, in s3, the handover manager monitors the quality of the wireless connection to the connected wireless access point 21 which is used as an indication of the relative proximity of the mobile device 7 and wireless access point 21. In this embodiment, quality is the SNR signal strength but the signal strength can also be calculated in combination with other variables such as throughput, error rate, dropped packet rate, etc.

In s5, the handover manager compares the signal strength against a threshold handover value loaded from the handover and user preferences database. If the quality is above the threshold, then no handover action is required and so the processing returns to s3.

If the processing of s5 determines that the quality of the connection has dropped below the threshold, this is an indication that the mobile device is moving outside of the range of the wireless access point, or that there is interference in the vicinity which is affecting the connection quality. In either case, since the quality to that wireless access point 21 is deteriorating, the handover manager must try to handover the mobile device 7 to a different connection to maintain the voice data link to the MMTel service.

In s7, the handover manager first checks whether a set of conditions have been satisfied, namely:
if WiFi handover is preferred for the client device;
are alternative WLANs available; and
are any of the identified neighboring wireless access points in the blacklist.
If it is determined that there is at least one non-blacklisted access point, then in step s9 the handover manager hands over the mobile device 7 to a new candidate WLAN, in the example above the WLAN 5b of the wireless access point 21b.

In s11, the handover manager instructs the IPSec manager to update the tunnel. The processing for the IPSec manager will be explained later.

After s11 the processing of the handover manager in respect to the first wireless access point 15 ends. However, now that the mobile device 7 is connected to WLAN 5b of the second wireless access point 21b, the processing of the handover manager will repeat on the WLAN 5b from s1.

Returning to s7, if the conditions are not met, then there are no non-blacklisted WLAN handover options currently available. Therefore in s13 the handover manager checks to see whether the mobile device 7 is configured so that VoLTE is preferred and available. If the LTE connection is preferred and available, then in s15 a handover is initiated to VoLTE via the cellular network and processing ends until the mobile device 7 reconnects to a wireless access point 21.

If VoLTE is not available, then in s17 a check is performed to see whether the settings will allow a handover to a mobile non-LTE cellular connection. If available, then in s19 there is a handover to a mobile broadband connection and in s11 the IPSec manager is instructed to update the tunnel to the ePDG and processing ends.

Finally, if the VoBB is not available, then processing ends such that the user will temporally lose connectivity until a suitable VoWiFi or VoLTE connection can be re-established.

Figure 7:
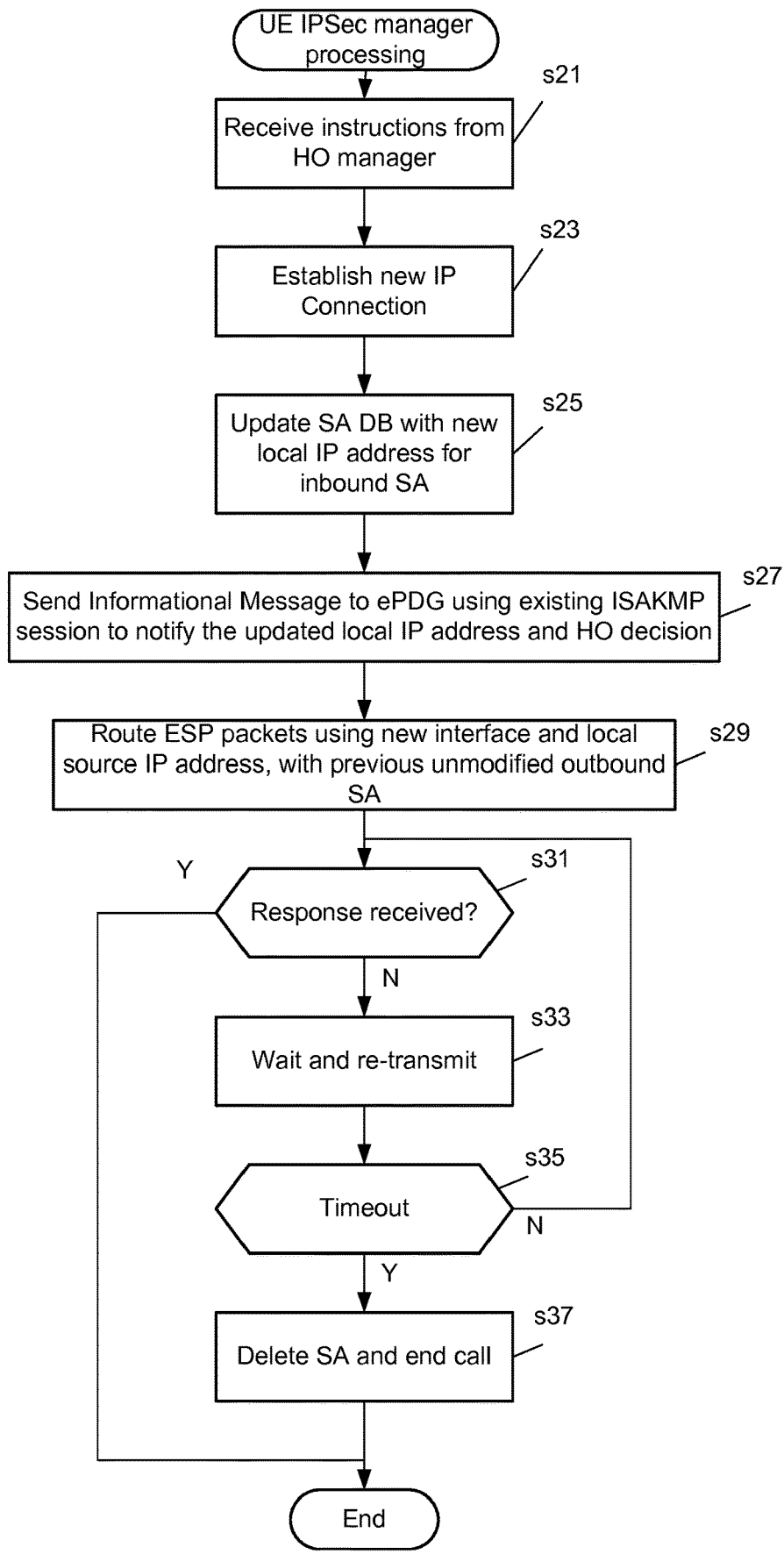
FIG. 7 is a flowchart of the processing of the IPSec manager shown in FIG. 4.

FIG. 7 is a flowchart showing the processing of the IPSec tunnel manager.

In s21, the IPSec manager receives instructions to handover from the handover manager. In this case the client device has already been re-connected to a new wireless access point and now the IPSec tunnel needs to be updated so that the ePDG 23 is aware of the new location for the mobile device 7.

In s23, a new connection is established to the WLAN 5b of the second wireless access point 21b. In s25, the SA is updated with new local address information, in particular the new IP address of the mobile device connected to the wireless access point 21 (or mobile broadband in accordance with the functioning of the handover manager).

Once the mobile device's 7 IPSec tunnel information has been updated, in s27 the IPSec manager sends an informational message to the ePDG's 23 IPSec manager using the existing Internet Security Association and Key Management Protocol (ISAKMP) session to notify the updated local IP address and handover manager decision. In this embodiment, this is carried out using the MOBIKE protocol defined in RFC 4555 herein incorporated by reference.

Next in s29 the Encapsulation Security Payload (ESP) packets are routed using the new interface and local source IP address. These packets are carried via the unmodified outbound SA. The ESP is one of the protocols forming part of the IPSec and relates to origin authenticity, integrity and confidentiality protection of packets.

In s31 a check is performed to determine whether the tunnel update has been successful based on the reception of a response message from the ePDG IPSec manager. If a response is received, then processing ends because the update has been successful. VoWiFi data packets are routed via the tunnel until the handover manager determines otherwise.

If a response is not received, then in accordance with user preference information, the IPSec manager waits for a period of time before re-transmitting in s33. At s35, while a timeout period has not expired, then processing returns to s31 to test for a response. However, if the timeout period expires and there is no response, then in s37 a clean up operation is carried out to delete the SA and end the call.

Figure 8:
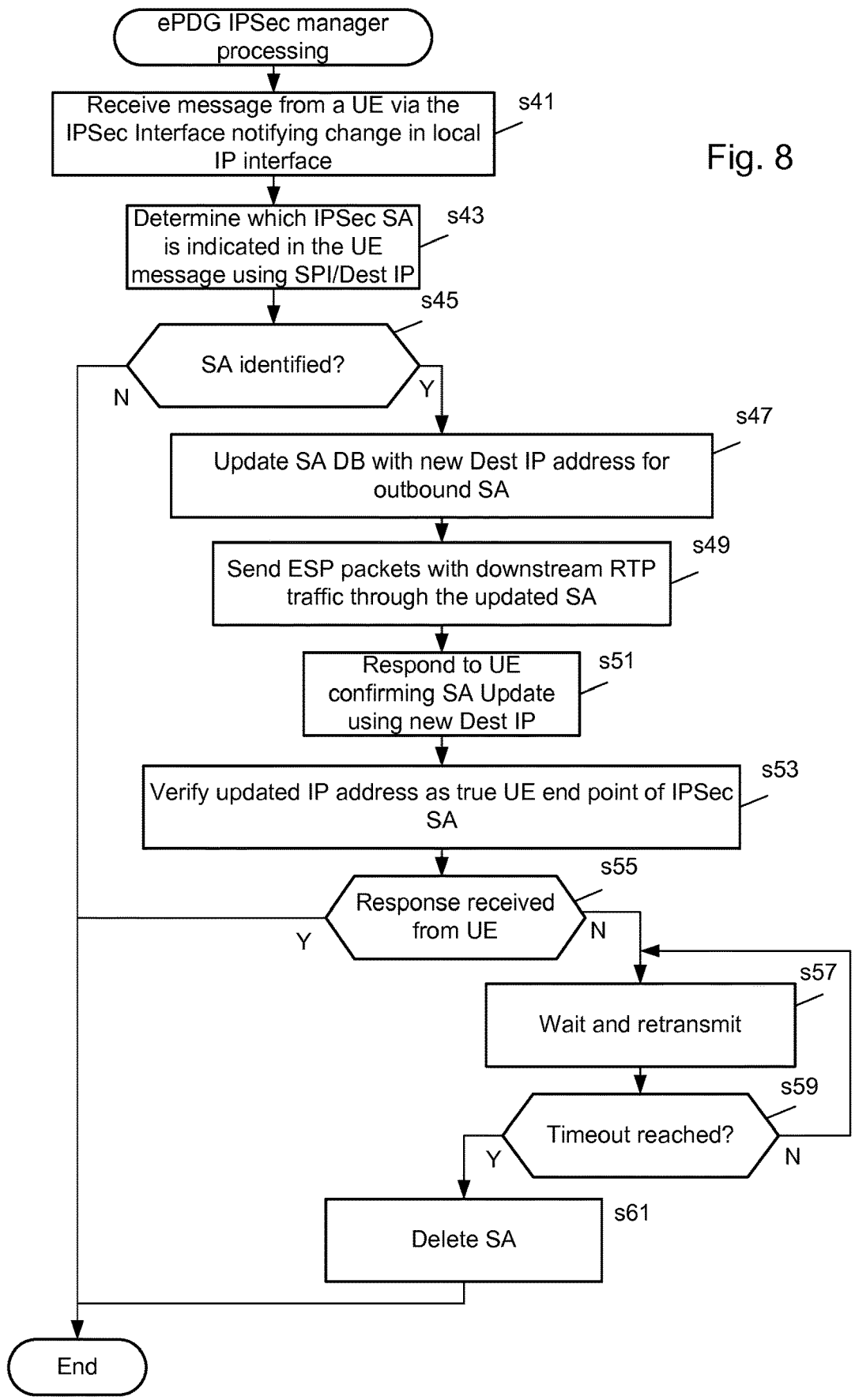
FIG. 8 is a flowchart showing the processing of an IPSec manager shown in FIG. 5.

FIG. 8 is a flowchart showing the processing of the ePDG IPsec manager.

Processing begins in s41, when the ePDG IPSec manager receives a message from a client device IPSec manager including a notification that there has been a change to the local IP interface. The message includes identifier information such as the SA SPI and destination IP address.

In s43, the ePDG IPSec manager determines which of the IPSec SAs is associated with the message.

In s45, if the received SA information cannot be used to identify an existing stored SA, then there is no IPSec information to update and so processing ends.

However if an SA can be identified, then in s47, that SA is updated with a new destination address for the outbound SA.

Next, in s49, the ePDG IPSec manager's ESP packets are sent with downstream RTP traffic through the updated SA. And in s51 the ePDG IPSec manager confirms the SA update using the new destination IP address provided.

In s53 the ePDG IPSec manager verifies the updated IP address as a true client device end point of the IPSec SA, in this embodiment this is carried out using a Return Routability Check procedure.

In s55 a check is carried out to test whether a response has been received from the client device which requested the update. If a response has been received then processing ends. If a response has not yet been received, then in s57 a timer is started so that the ePDG IPSec manager waits a predetermined period of time before trying to re-transmit the client device response initially delivered in s51. At s59 the timeout period is evaluated and if the timeout has not been reached the ePDG IPSec manager waits again to retransmit the response message.

If however, the timeout period has elapsed, in s61, the SA is deleted and processing ends.

In the first embodiment, the handover behavior of the client device is modified to enable VoWiFi to VoWiFi handovers where possible. This processing reduces the overhead on the ePDG and client device for the maintenance of data tunnels because there is need to tear down and re-establish a sets of data tunnels following the migration from a first wireless access point to a second wireless access point.

Insofar as embodiments of the disclosure described are implementable, at least in part, using a software-controlled programmable processing device, such as a microprocessor, digital signal processor or other processing device, data processing apparatus or system, it will be appreciated that a computer program for configuring a programmable device, apparatus or system to implement the foregoing described methods is envisaged as an aspect of the present invention. The computer program may be embodied as source code or undergo compilation for implementation on a processing device, apparatus or system or may be embodied as object code, for example.

Suitably, the computer program is stored on a carrier medium in machine or device readable form, for example in solid-state memory, magnetic memory such as disk or tape, optically or magneto-optically readable memory such as compact disk or digital versatile disk etc., and the processing device utilizes the program or a part thereof to configure it for operation. The computer program may be supplied from a remote source embodied in a communications medium such as an electronic signal, radio frequency carrier wave or optical carrier wave. Such carrier media are also envisaged as aspects of the present disclosure.

It will be understood by those skilled in the art that, although the present disclosure has been described in relation to the above described example embodiments, the invention is not limited thereto and that there are many possible variations and modifications which fall within the scope of the claims.

The scope of the present disclosure includes any novel features or combination of features disclosed herein. The applicant hereby gives notice that new claims may be formulated to such features or combination of features during prosecution of this application or of any such further applications derived therefrom. In particular, with reference to the appended claims, features from dependent claims may be combined with those of the independent claims and features from respective independent claims may be combined in any appropriate manner and not merely in the specific combinations enumerated in the claims.

The invention claimed is:

1. A method of performing network handover between wireless local area network devices for a mobile device connected to a voice service via a secure data tunnel to a packet data gateway of a cellular network, comprising:
    determining that a quality of a connection to a current wireless local area network is below a threshold value;
    determining that a target handover wireless local area network is available;
    establishing connectivity with the target handover wireless local area network from the current wireless local area network;
    suppressing a connection to a base station of the cellular network;
    sending a new network address of the mobile device to the packet data gateway using a set of credentials relating to the secure data tunnel so as to change an endpoint of the secure data tunnel to the new network address;
    monitoring for a response from the packet data gateway identifying whether the changes to the endpoint of the secure data tunnel has been performed; and
    terminating the voice service is the response is received by the mobile device within a timeout period.

2. The method according to claim 1, wherein the secure data tunnel is an IPSec tunnel and an IP address is updated as the endpoint of the secure data tunnel.

3. A non-transitory computer-readable storage medium storing processor executable instructions for causing a programmable processor to carry out the method of claim 1.

4. An apparatus for connecting to a voice service via a secure data tunnel to a packet data gateway of a cellular network and operable to perform network handover between wireless local area network devices via a secure data tunnel to a packet data gateway of a cellular network, comprising:
    a cellular network interface;
    a wireless local area network interface;

a processor configured to:
- determine that a quality of a connection to a current wireless local area network is below a threshold value,
- determine that a target handover network is available,
- establish connectivity with the target handover network,
- suppress a connection to a base station of the cellular network,
- send means for sending a new network address of the mobile device to the packet data gateway using a set of credentials relating to the secure data tunnel so as to change an endpoint of the secure data tunnel to the new network address,
- monitor for a response from the packet data gateway identifying whether the change to the endpoint of the secure data tunnel has been performed, and
- terminate the voice service if the response is received by the mobile device within a timeout period.

5. The apparatus according to claim 4, wherein the secure data tunnel is an IPSec tunnel and an IP address is updated as the endpoint of the tunnel.

\* \* \* \* \*